United States Patent [19]

Nagata et al.

[11] 4,123,756

[45] Oct. 31, 1978

[54] BUILT-IN MINIATURE RADIO ANTENNA

[75] Inventors: Koichi Nagata; Takashi Oda; Koji Yamashita, all of Tokyo, Japan

[73] Assignee: Nippon Electric Co., Ltd., Tokyo, Japan

[21] Appl. No.: 835,755

[22] Filed: Sep. 22, 1977

[30] Foreign Application Priority Data

Sep. 24, 1976 [JP] Japan ................................ 51-115060

[51] Int. Cl.² .......................... H01Q 1/24; H01Q 7/00; H04B 1/08

[52] U.S. Cl. .................................... 343/702; 325/354; 343/748

[58] Field of Search ............... 343/702, 718, 748, 873; 325/354

[56] References Cited

U.S. PATENT DOCUMENTS

| | | | |
|---|---|---|---|
| 3,364,487 | 1/1968 | Maheux | 343/702 |
| 3,573,628 | 4/1971 | Cramer et al. | 343/702 |
| 3,736,591 | 5/1973 | Rennels et al. | 343/702 |
| 3,778,836 | 12/1973 | Tanaka | 343/702 |

*Primary Examiner*—Alfred E. Smith
*Assistant Examiner*—Harry E. Barlow
*Attorney, Agent, or Firm*—Sughrue, Rothwell, Mion, Zinn and Macpeak

[57] ABSTRACT

A miniature radio antenna formed integral with a molded plastic housing comprising a body 1 and a cover 2. The antenna 1′, 1″, 2′, 2″ includes sheets, foils or films of electrically conductive metal or coats of conductive paint laid on the inside surfaces of the opposing housing sections, or conductors embedded therein. The antenna is free from adverse acoustic effects due to resonant vibrations in sympathy with a speaker mounted in the housing, and the housing may be molded into any desirable external shape, including fully rounded corners, without increasing the size.

6 Claims, 4 Drawing Figures

BUILT-IN MINIATURE RADIO ANTENNA

BACKGROUND OF THE INVENTION

This invention relates to antennas for portable radios, particularly miniature radios of the type having a molded plastic housing which is partly electrically conductive to also serve as the radio antenna.

A prior art radio set of this general type, as disclosed, for example, in U.S. Pat. No. 3,736,591, has included a compound housing structure comprising a box-like molded plastic casing and a U-shaped metallic cover slidably fitted thereover via groove means to serve as a receiving antenna. Such a housing structure is disadvantageous in that the casing box inside the metallic cover is limited to its volumetric capacity to accommodate the radio circuitry components in view of the external dimensions of the cover, and this acts against miniaturization and portability. To increase the internal volume of the housing structure the roundness of the edges or corners of the housing must be reduced on both the outside and inside, and such increased angularity of the housing corners is more likely to tear the pocket of the users suit in which the radio is inserted and carried.

Further, with a speaker device mounted in the housing the thin metallic cover is liable to vibrate in sympathetic resonance with the speaker, thus producing undesirable and annoying acoustic effects. In addition, when the radio is hand held at a low temperature, e.g., $-10°$ C., it may become difficult to release the cold metallic cover of the housing due to skin moisture freezing.

SUMMARY OF THE INVENTION

It is thus an object of the present invention to provide an antenna for a miniature radio which is free from the disadvantages noted above and is formed integral with a housing structure, including a body or casing and a cover therefor, both formed of plastic material, by making part of the housing electrically conductive to serve as the radio antenna.

According to the present invention an antenna for a miniature radio of the type having a housing structure formed of plastic material in two parts, including a casing member for accommodating the radio circuitry and a cover member overlying the casing member, comprises first and second electrically conductive members provided respectively on opposing sections of the housing structure, first means for interconnecting the first and second conductive members at their one ends with the cover member held in place and fitted to the casing member, and second means for connecting the first and second conductive members to the radio circuit at their other ends.

DETAILED DESCRIPTION OF THE PREFERRED EMBODIMENT

Figure 1:
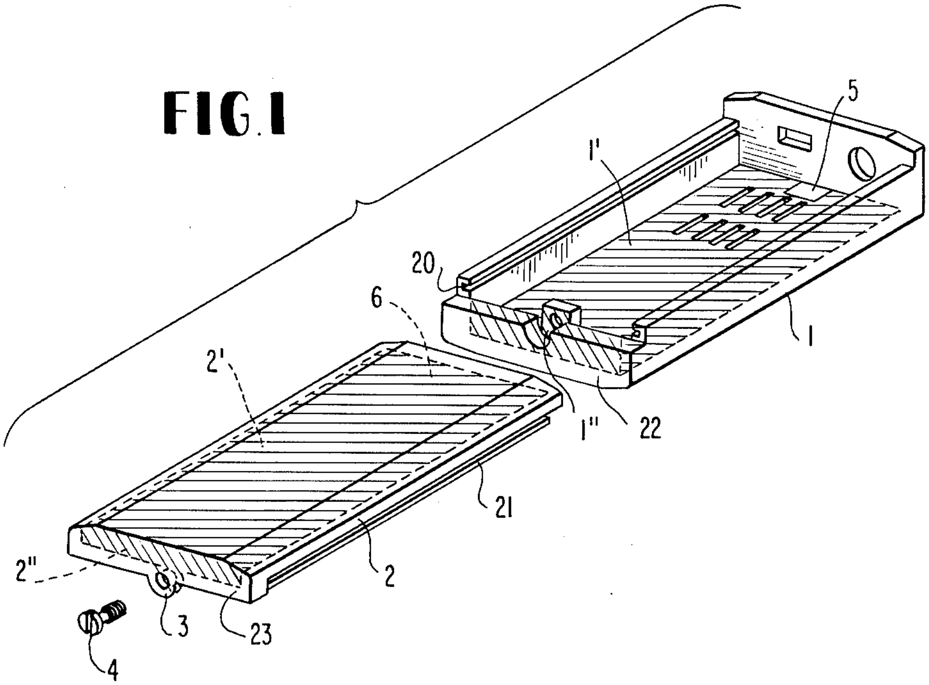
FIG. 1 is a perspective view showing one embodiment of a housing structure in a disassembled state and including an antenna formed thereon in accordance with the present invention.
Figure 2:
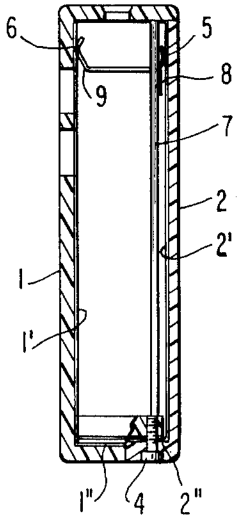
FIG. 2 is a side elevational view, in longitudinal cross section, showing the housing structure of FIG. 1 in an assembled state.

Referring to FIGS. 1 and 2, a housing structure is formed in two molded plastic parts, a casing or box-like body member 1 and a cover member 2. The casing 1 is formed with a pair of opposite longitudinally extending grooves 20 inside of the side walls thereof, while the cover 2 is formed with a pair of longitudinally extending lateral projections 21 on the opposite sides thereof which are slidably received in the casing grooves. The two housing members 1 and 2 are assembled into a unitary structure by slidably fitting the cover projections 21 into the mating grooves 20 through the openings thereof on one end wall 22 of the casing 1, and then securing the cover to the casing by a headed screw 4 which is threaded into a tapped hole formed in a "nut-like" post 1'' on the inside of the casing through a hole 3 formed in a projection on the end wall 23 of the cover adjacent to the casing end 22 in the assembled state.

Figure 3:
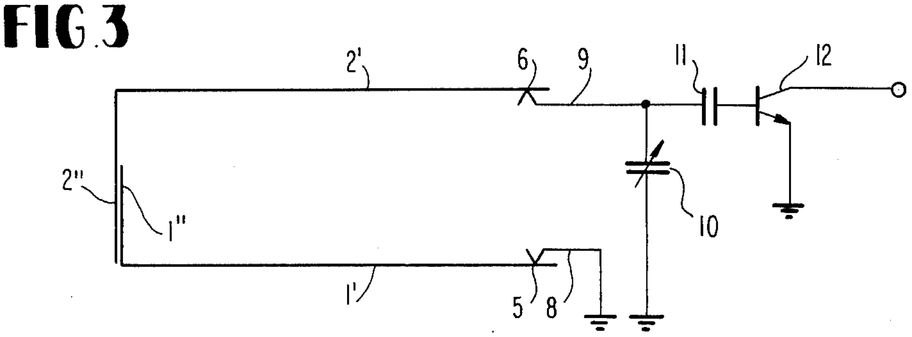
FIG. 3 is a schematic circuit diagram showing the connection of the antenna with the receiver circuit.

The interior of the housing structure is made partly electrically conductive, for example, by lining the respective major flat inside surfaces 1' and 2' of the casing 1 and cover 2, respectively, and the inside surfaces 1'' and 2'' of the respective end walls 22 and 23 with thin sheets of electrically conductive metal, as indicated in FIG. 1 by hatching. In the assembled state the metal sheets are held in contact with each other to form a U-shaped antenna loop extending along the interior surfaces of the housing around the screw-fastened end walls thereof. As shown in FIG. 2, a printed circuit board 7 is fixedly mounted in the housing and is provided with a pair of contact springs 8 and 9 on the opposite sides thereof. The end portions 5 and 6 of the conductive loop are held in contact with the springs 8 and 9 to thus act as an antenna for the radio circuit, which is connected to the contact springs and includes components such as a transistor 12 and capacitors 10 and 11, as shown in FIG. 3.

It will be readily appreciated that, according to the present invention, the metal sheets forming the radio antenna may be made very thin or in the form of foil, and thus not occupy any substantial portion of the interior space of the housing. The external appearance of the housing, which is moldable of plastic material, can be freely designed and have the corners and edges thereof smoothly rounded to any desired extent. Further, as metal foils can be tightly adhered to the housing to form an integral part thereof, there is no problem with the antenna vibrating in resonance with a speaker or other component mounted in the housing.

Figure 4:
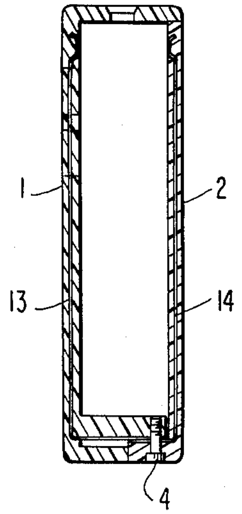
FIG. 4 is a view similar to FIG. 2 illustrating another embodiment of the invention.

Though only one preferred embodiment of the invention has been described, it is to be understood that the partial "conductorizing" of the housing may be performed in various ways other than that disclosed, within the scope of the invention. For example, in another embodiment shown in FIG. 4, antenna conductors 13 and 14 are embedded in the respective walls of the plastic casing 1 and cover 2. Metallic contact portions are also embedded, and are exposed on the interior of the housing for electrical engagement, upon assembly, with the springs 8 and 9 at their one ends and with each other at their other ends proximate the screw and post fastening means.

The conductor portions of the housing structure are not limited to the separate forms described above, and may alternatively be formed by the plating or vapor deposition of an appropriate conductive metal over selective areas of the housing. It will also be apparent that the same results can be obtained by coating or printing an electrically conductive paint material over the selected housing areas instead of plating or vapor deposition.

Further, although in the embodiments illustrated the cover 2 is slidably fitted to the casing body 1 by means of projections 21 and grooves 20, the two housing members may be joined together by screw means or the like.

What is claimed is:

1. An antenna for a miniature radio of the type having a housing structure formed of plastic material in two sections including a casing member adapted to accommodate a radio circuit and a cover member overlying said casing member, comprising:

(a) first and second electrically conductive members provided, respectively, on opposing sections of said housing structure, (b) first means for interconnecting said first and second conductive members at their one ends when said cover member is fitted to said casing member, and (c) second means for connecting said first and second conductive members to said radio circuit at their other ends.

2. An antenna as set forth in claim 1, wherein said conductive members are sheets of electrically conductive metal attached to the respective inside surfaces of said casing member and cover member.

3. An antenna as set forth in claim 1, wherein said conductive members are foils of electrically conductive material adhered onto the respective inside surfaces of said casing member and cover member.

4. An antenna as set forth in claim 1, wherein said conductive members are layers of electrically conductive paint coated or imprinted on the respective inside surfaces of said casing member and cover member.

5. An antenna as set forth in claim 1, wherein said conductive members are embedded in said casing member and cover member.

6. An antenna as set forth in claim 1, wherein:

(a) said cover member is slidably assembled to said casing member from one end thereof, and (b) said conductive members comprise substantially flat, parallel portions and inwardly projecting end portions at said one ends, whereby said end portions are brought into electrical contact with each other upon the assembly of said cover member to said casing member to thereby form a U-shaped antenna.

* * * * *